(12) United States Patent
Bugel et al.

(10) Patent No.: US 7,353,743 B2
(45) Date of Patent: Apr. 8, 2008

(54) MULTI-VALVE FLUID OPERATED CYLINDER POSITIONING SYSTEM

(75) Inventors: John Bugel, Largo, FL (US); Jeff Moler, Sarasota, FL (US); Mark P. Oudshoorn, Parrish, FL (US)

(73) Assignee: Viking Technologies, L.C., Sarasota, FL (US)

( * ) Notice: Subject to any disclaimer, the term of this patent is extended or adjusted under 35 U.S.C. 154(b) by 37 days.

(21) Appl. No.: 10/817,511

(22) Filed: Apr. 2, 2004

(65) Prior Publication Data

US 2004/0261608 A1    Dec. 30, 2004

Related U.S. Application Data

(63) Continuation-in-part of application No. 10/763,500, filed on Jan. 23, 2004.

(51) Int. Cl.
*F15B 15/28* (2006.01)
(52) U.S. Cl. .......................................... 91/392; 91/433
(58) Field of Classification Search .................. 91/392, 91/393, 397, 403, 433
See application file for complete search history.

(56) References Cited

U.S. PATENT DOCUMENTS

| | | | |
|---|---|---|---|
| 3,099,289 A | 7/1963 | Neilson et al. | |
| 4,080,873 A | 3/1978 | Bauer et al. | |
| 4,106,390 A | 8/1978 | Kodaira et al. | |
| 4,121,504 A | 10/1978 | Nowak | |
| 4,379,335 A | 4/1983 | Kirsch et al. | |
| 4,431,873 A | 2/1984 | Dunn et al. | |
| 4,450,753 A | 5/1984 | Basrai et al. | |
| 4,481,451 A | 11/1984 | Kautz et al. | |
| 4,481,768 A | 11/1984 | Goshorn et al. | |
| 4,628,499 A | 12/1986 | Hammett | |

(Continued)

FOREIGN PATENT DOCUMENTS

DE    199 12 334 A1    9/2000

(Continued)

OTHER PUBLICATIONS

Yeaple, Fluid Power Design Handbook Marcel Dekker, Inc. pp. 73-79.*

(Continued)

*Primary Examiner*—F. Daniel Lopez
(74) *Attorney, Agent, or Firm*—Young Basile

(57) ABSTRACT

A position control system is used for controlling a fluid operated cylinder having at least one fluid chamber defined by a piston located within a housing for movement between first and second end limits of travel. The system includes at least two electrically actuated proportional flow control valves connected to each port of the cylinder for selectively and proportionally controlling fluid flow into and out of the at least one chamber. At least one pressure sensor is provided for measuring fluid pressure with respect to each chamber. At least one discreet position sensor is located adjacent a midpoint of the cylinder for sensing a discreet centered position of the piston. A controller includes a program and is operably connected for controlling actuation of the at least two valves in response to pressure measured by the at least one pressure sensor and location measured by the at least one position sensor.

26 Claims, 3 Drawing Sheets

U.S. PATENT DOCUMENTS

| | | | |
|---|---|---|---|
| 4,686,338 | A | 8/1987 | Kashiwagi et al. |
| 4,736,131 | A | 4/1988 | Fujimoto |
| 4,741,247 | A | 5/1988 | Glomeau et al. |
| 4,763,560 | A | 8/1988 | Sasaki |
| 4,790,233 | A | 12/1988 | Backe et al. |
| 4,808,874 | A | 2/1989 | Stahlhuth |
| 4,819,543 | A | 4/1989 | Leinen |
| 4,878,417 | A | 11/1989 | Facon |
| 4,901,625 | A | 2/1990 | Bussan et al. |
| 4,932,311 | A | 6/1990 | Mibu et al. |
| 5,154,207 | A | 10/1992 | Bolt |
| 5,211,196 | A | 5/1993 | Schwelm |
| 5,271,226 | A | 12/1993 | Stone |
| 5,333,455 | A | 8/1994 | Yoshioka |
| 5,388,751 | A | 2/1995 | Harada et al. |
| 5,400,824 | A | 3/1995 | Gschwendtner et al. |
| 5,424,941 | A | 6/1995 | Bolt et al. |
| 5,425,941 | A | 6/1995 | Wilson et al. |
| 5,431,086 | A | 7/1995 | Morita et al. |
| 5,465,021 | A | 11/1995 | Visscher et al. |
| 5,546,847 | A | 8/1996 | Rector et al. ............... 91/403 |
| 5,587,536 | A | 12/1996 | Rasmussen |
| 5,881,767 | A | 3/1999 | Loser |
| 5,950,668 | A | 9/1999 | Baumann |
| 6,003,428 | A | 12/1999 | Mundie et al. |
| 6,023,121 | A | 2/2000 | Dhuler et al. |
| 6,085,632 | A | 7/2000 | Stoll et al. |
| 6,230,606 | B1 | 5/2001 | Sato |
| 6,234,060 | B1 | 5/2001 | Jolly |
| 6,255,934 | B1 | 7/2001 | Gadini et al. |
| 6,291,928 | B1 | 9/2001 | Lazarus et al. |
| 6,305,264 | B1 | 10/2001 | Yang et al. |
| 6,333,583 | B1 | 12/2001 | Mahadevan et al. |
| 6,431,340 | B1 | 8/2002 | Ineson et al. |
| 6,453,261 | B2 | 9/2002 | Boger et al. |
| 6,467,264 | B1 | 10/2002 | Stephenson et al. .......... 60/368 |
| 6,523,451 | B1 | 2/2003 | Liao et al. |
| 6,548,938 | B2 | 4/2003 | Moler et al. |
| 6,567,255 | B1 | 5/2003 | Panzer et al. |
| 6,619,142 | B1 | 9/2003 | Forster et al. |
| 6,642,067 | B2 | 11/2003 | Dwyer |
| 6,759,790 | B1 | 7/2004 | Bugel et al. |
| 6,870,305 | B2 | 3/2005 | Moler |
| 2001/0030306 | A1 | 10/2001 | Moler et al. |
| 2004/0035106 | A1 | 2/2004 | Moler et al. |
| 2004/0045148 | A1 | 3/2004 | Moler |
| 2004/0125472 | A1 | 7/2004 | Belt |

FOREIGN PATENT DOCUMENTS

| | | |
|---|---|---|
| DE | 101 222 97 C1 | 6/2002 |
| EP | 0 325 764 | 8/1989 |
| EP | 1 391 647 | 6/2003 |
| GB | 2203195 A | 10/1988 |
| JP | 60-180026 | 9/1985 |
| JP | 6129681 | 12/1986 |
| JP | 01185175 | 7/1989 |
| WO | WO 01/78160 | 10/2001 |

OTHER PUBLICATIONS

Kenji Okiyama and Ken Ichiryu; Study of Pneumatic Motion Base Control Characteristics; Tokyo University of Technology.

Karim Khayati, Pascal Bigras, and Louis-A. Dessaint; Nonlinear Control of Pneumatic Systems; Ecole de Technologie Superieure; 1100, rue Notre-Dame Quest, Montreal (Quebec) H3C IK3.

High Speed Servo Pneumatic Actuator Systems; (modified on Jan. 13, 2004); Design of High Speed Machinery (DHSM) LINK Programme; Engineering & Physical Sciences Research Council; Department of Trade & Industry; Mar. 1995 to Aug. 1997, Grant Reference: GR/K38663.

Journal of Zhejiang University SCIENCE; (ISSN 1009-3095, Monthly), 2001 vol. 2, No. 2, pp. 128-131; CLC No. TP271, 32: Document Code: A; Research on the Continuous Positioning Control to Servo-Pneumatic System; Tao Guo-liang, Wang Xuan-yin, & Lu Yong-xiang.

Modeling and Simulation of a Servopneumatic Gripper; Salvador Esque and Jose LM Lastra, date Dec. 10, 1999.

Modified Feedback Linearization Controller for Pneumatic System With Non-Negligible Connection Port Restriction; Pascal Bigras, Karim Khayati, Tony Wong; Univeristy of Quebec.

ND9000 Intelligent Valve Controller; Metso Automation; dated Jul. 7, 2003.

Introducing Precisionaire—A Breakthrough Pneumatic Motion System.

Axis Controller SPC 200; Fest AG&Co.; Products 2001.

Kuhnke "Speedy" Machine Building Process Module; Switched Pneumatic Electrical Endposition Damping- E635 GM/02 92.652.

Switched Pneumatic Electrical Endposition Damping; Werner Brockman; University of Lubeck Institute of Computer Engrg. Lubeck, Germany.

Block-Oriented Nonlinear Control of Pneumatic Actuator Systems; fulin Xiang; Doctoral Thesis, Mechatronics Lab, Department of Machine Design, Royal Institute of Technology, KTH; S-100 44, Stockholm, Sweden, 2001.

Hydraulic & Pneumatic Actuators; Senors & Actuators for Mechatronics Hydraulic and Pneumatic Actuators; K. Craig.

Adaptive Neuron Control Based on Predictive Model in Pneumatic Servo System; Huang Wenmei, Yang Yong, Tang Yali; College of Mechanical and Automotice Engrg. Hunan University, 410082, Changsha, Huna, P.R. China.

Propneu—An Intelligent Software Tool; Hong Zhou, Ph.D., Festo AG & Co., Ruiterstr, 82, D-73734, Esslingen, Germany.

Pneumatic Servo Systems Controlled by Self-Tuning Fuzzy Rules; Akira Shimizu, Satoru Shibata, and Mitsuru Jindai, Dept. of Mech. Eng. Ehime University, 3, Bunkyo-cho, 790-8577, Matsuyama, Ehime, Japan.

Modelica—Proceedings of the $3^{rd}$ International Modelica Conference, Linkoping, Nov. 3-4, 2003, Peter Fritzson (editor).

High Steady-State Accuracy Pneumatic Servo Positioning System with PV A/PV Control and Friction Compensation; Shu Ning and Gary M. Bone; Dept. of Mechanical Engrg., McMaster University, Hamilton, Ontario, Canada, L8S 4L7. Proceedings of the 2002 IEEE, International Conference on Robotics & Automation, Washington, DC—May 2002.

A Hybrid Pneumatic/Electrostatic Mili-Actuator; Kenneth H. Chiang, Ronald S. Fearing; Robotics and Intteligent Machines Laboratory; Dept. of Electrical Engrg. And Computer Sciences; 265M Cory Hall, University of California, Berkley, CA 94720-1770.

Modeling Identification, and Control of a Pneumatically Actuated, Force Controllable Robot; J.E. Bobrow and B.W. McDonell; Irvine, California 92697.

Modelling and Simulation of Pneumatic Cylinders for a Physiotherapy Robot; R. Richardson, A.R. Plummer, M. Brown; School of Mechanical Engrg., University of Leeds, UK; Instron Ltd., UK.

High Speed Servo Pneumatic Actuator Systesm; (modified on Jan. 13, 2004); Design of High Speed Machinery (DHSM) LINK Programme; Engineering & Physical Sciences Research Council; Department of Trade & Industry; Mar. 1995 to Aug. 1997, Grant Reference: GR/K38663.

Modeling and Simulation of Servopneumatic Gripper; Salvador Esque and Jose LM Lastra, dated Dec. 10, 1999.

ND9000 Intelligent Valve Controller; Metso Automation; dated Jul. 2003.

Block-Oriented Nonlinear Control of Pneumatic Actuator Systems; fulin Xiang; Doctoral Thesis, Mechatronics Lab, Department of Machine Design, Royal Institute of Technology, KTH; S-100 44, Stockholm, Sweden, 2001.

Modelica—Proceedings of the 3rd International Modelica Conference, Linkoping, Nov. 3-4, 2003, Peter Fritzson (editor).

High Steady-State Accuracy Pneumatic Servo Positioning System with PV A/PV Control and Friction Compensation; Shu Ning and Gary M. Bone; Dept. of Mechanical Engrg., McMaster University, Hamilton, Ontario, Canada, L8S 4L7. Proceedings of the 2002 IEEE, International Conference on Robotics & Automation, Washington, DC—May 2002.

* cited by examiner

MULTI-VALVE FLUID OPERATED CYLINDER POSITIONING SYSTEM

CROSS-REFERENCE TO RELATED APPLICATIONS

This application claims the benefit of provisional patent application Ser. No. 60/460,549 filed on Apr. 4, 2003, and is a continuation-in-part of application Ser. No. 10/763,500 filed Jan. 23, 2004, both of which are incorporated by reference herein in their entireties.

FIELD OF THE INVENTION

The present invention relates to a multi-valve positioning system for a fluid operated cylinder having at least one expandible chamber defined by a housing enclosing a movable piston.

BACKGROUND OF THE INVENTION

Sales of cylinder positioning systems have generally fallen into one of two categories, simple and complex. A simple system is inexpensive, and typically uses timing or limit switches to achieve control. Although this type of system has significant cost advantages, it has some performance disadvantages. Limit switch systems lack the ability to dynamically change the point or points at which the cylinder stops, and timing controlled systems require constant pressure, load, and wear. Complex systems are more tolerant of pressure, load, and wear changes but have disadvantages in cost and complexity. Complex systems can cost between 10 and 20 times more than the simple system. The complex systems typically use fragile or expensive sensor technology, and require a trained, experienced person for installation.

SUMMARY OF THE INVENTION

It would be desirable in the present invention to provide an inexpensive and accurate fluid operated cylinder positioning system. It would be desirable to provide a system relatively tolerant of pressure, load, and wear changes while maintaining low cost and simplicity. Accordingly, the present invention discloses an accurate and inexpensive fluid operated cylinder positioning system and method. Positioning a cylinder or valve mainstage based on differential pressure according to the present invention can be a viable method of control that is more cost effective and completely different from current offerings by industry leaders. The present invention uses standard, inexpensive components and techniques to achieve control with accuracy approaching that of an expensive system, but with a cost comparable to a simple system.

A position control system according to the present invention is used for controlling a fluid operated cylinder having at least one fluid chamber defined by a piston located within a housing for movement between first and second end limits of travel. The system includes at least two electrically actuated proportional flow valves connected to each port of the fluid operated cylinder to be controlled for selectively and proportionally controlling fluid flow into and out of the at least one fluid chamber of the fluid operated cylinder to be controlled. At least one pressure sensor is provided for measuring fluid pressure with respect to each chamber of the fluid operated cylinder to be controlled. At least one discreet position sensor is located adjacent a midpoint of the fluid operated cylinder to be controlled for sensing a discreet centered position of the piston within the cylinder. A control program according to the present invention is operably connected to the at least two valves, the at least one pressure sensor, and the at least one position sensor for controlling actuation of the at least two valves in response to pressure measured by the at least one pressure sensor and location measured by the at least one position sensor.

A multi-valve positioning system according to the present invention, by way of example and not limitation, such as a four-pack valve manifold, was developed primarily for pneumatic cylinder control. A cylinder has two active chambers that effect a change in position and force of the cylinder rod. The four-pack connects two proportional valves to each of these chambers, one to add fluid, such as air, to the chamber and one to remove fluid, such as air, from the chamber. The valves are manifolded to allow a reduction in packaging size and to reduce the required number of fluid connections from eight to four. The manifold also houses the control electronics and three pressure transducers. The electronics, along with onboard software, control the four valves in response to commands from an external source, i.e. a network or personal computer connection. The pressure transducers monitor inlet pressure and pressure on both sides of the cylinder in an effort to control the dispensing of fluid, such as air, to and from the cylinder, thereby allowing precise control of the rod output force. The present invention is believed to have one or more of the following novel aspects: (1) combining four electrically actuated, non-solenoid, direct acting proportional valves with control electronicsinto a single manifold for cylinder control; (2) integration of pressure transducers on the inlet to the manifold and both outlets; (3) use of pressure differential to determine position and force control of the cylinder rod; (4) integration of control electronics for position & force control directly in the valve pack; (5) operation of the valve pack using only the power from the control logic source, in this case a USB port of a notebook computer; and/or (6) reduction of size and weight of the valve pack while providing adequate performance to allow the valve pack to be integrated into the cylinder It would be desirable in the present invention to provide very high performance levels for various pneumatic actuators without complex sensor/feedback systems. The present invention has primary applications with pneumatic cylinders, by way of example and not limitation, by using a "basic" cylinder equipped with "simple" position sensors, the present invention can provide the ability to accurately adjust the stop location of the cylinder piston at any point on the stroke, adjust acceleration/deceleration along the stroke and adjust velocity along the stroke, where all adjustments can be make "on the fly", and the present invention can adjust and control the applied force by the cylinder, provide operating statistics of cylinder operation and diagnostic information for the controlled cylinder. The present invention can also be used in providing control of "large" process control valves. Various industries, for example petrochemical, water treatment, food and beverage processing, use valves with internal diameters greater than one inch (1"). Such valves are frequently operated in a proportional mode rather than simply on/off. Automated control of such valves is typically accomplished by a directly coupled electric motor or by operation of a pneumatically powered actuator. The present invention can improve control of such pneumatic actuators. The present invention can also control other pneumatic actuators or act as a positioner for a large valve.

It can also be used to provide pressure regulation as an I/P or V/P transducer. Yet other applications exist that use pneumatic actuation, for example rotary motors. The present invention can be used to provide improved control of such devices.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
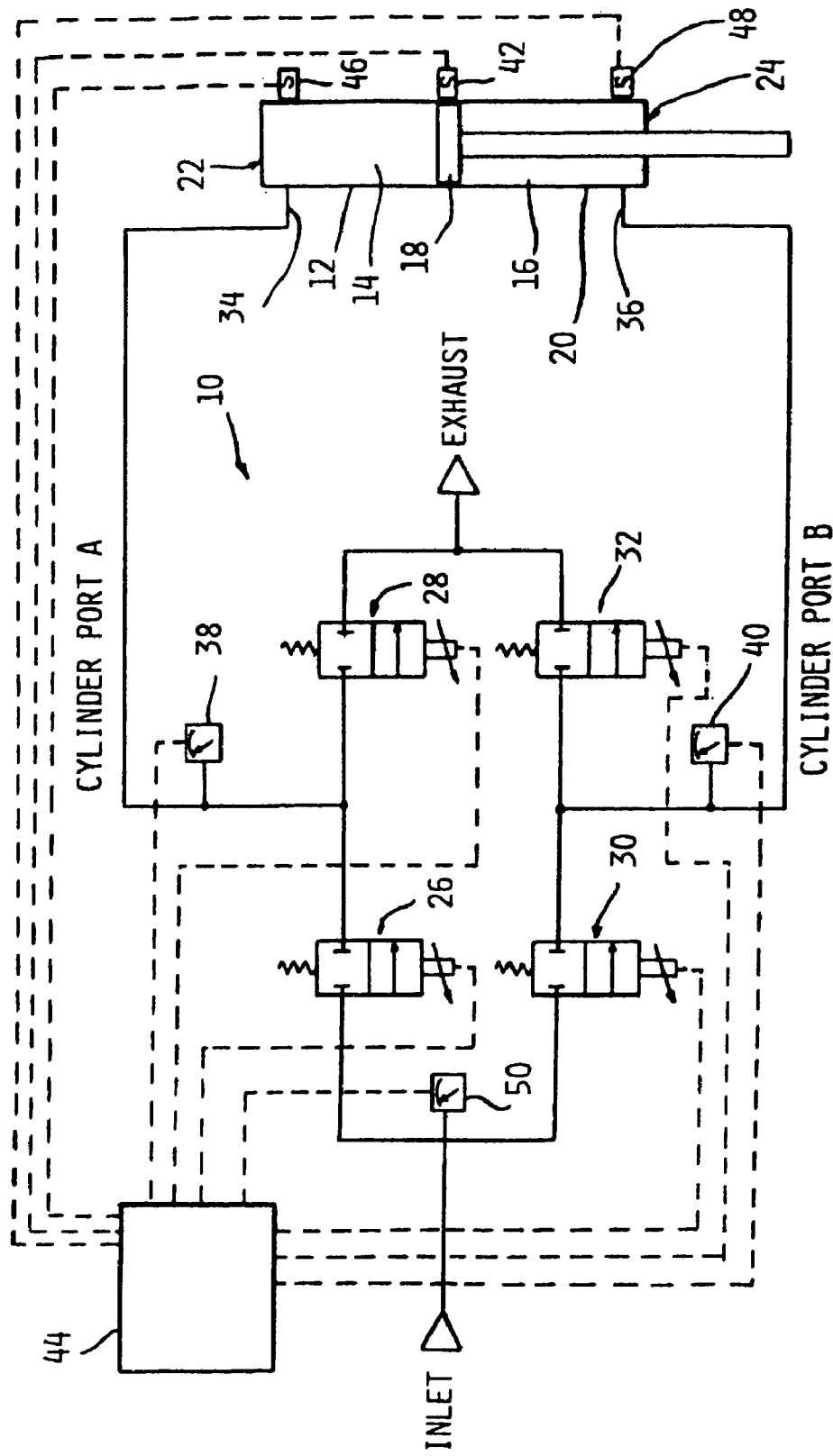
FIG. 1 is a simplified schematic diagram of a multiple valve configuration for controlling fluid flow with respect to at least one expandable chamber of a fluid operated cylinder in accordance with a control program stored in memory.

The present invention implements a pneumatic cylinder control scheme with a cost comparable to a simple system, but with performance approaching that of a complex system. The control scheme according to the present invention is a combination of hardware and software. The hardware is supportive of the required functions. However, actual operation is determined by the software. Further, the software is constructed in such a fashion that variables determine the actual final operation. This approach allows for example, a variety of motion profiles, i.e. control of acceleration/deceleration profiles, velocity, timing, force, repetition, etc. In addition, this control scheme allows operation of either dual acting cylinders or single acting cylinders. In other words, the present invention can operate cylinders with fluid control on both sides, or cylinders with fluid on one side and a mechanism such as a spring to cause return on the other side. Although the description contained herein is oriented toward pneumatically operated cylinders, the control scheme according to the present invention, described also applies to other fluids such as hydraulics or other liquids. In yet another application of this control scheme, the cylinder can be replaced by a main stage valve. These are typically very large valves. In this case, the control scheme acts as a proportional pilot for the mainstage, allowing proportional positioning of the mainstage valve. Historically, the valve industry has used complex methods such as torque motors or proportional valves with precision fee back for controlling such mainstage valves. The device used for this application is referred to as a valve positioner control. The control scheme described herein according to the present invention can therefore be used to replace the existing positioner control. As with the cylinder, the mainstage valve can be operated with various fluids and can operate as a dual acting or as a single acting mainstage positioner.

According to the present invention, a method of controlling a standard pneumatic cylinder can be developed with reasonable accuracy by monitoring and changing the pressure on one or both sides of the piston. The basic theory behind this type of cylinder control is that if a known volume, i.e. a cylinder chamber, has a given amount of air pressure within that known volume, it will exert a known force on the chamber. This is demonstrated by the basic formula:

$$\text{Force} = \text{Pressure} \times \text{Area} \tag{1}$$

With a known load and some reasonable assumptions about friction, the forces can be calculated on each side of the piston in a pneumatic cylinder. These forces will directly equate to the piston moving a known distance. The theory behind this assumption is proven in the next section In order to implement this type of control, three variables are monitored. First, two signals corresponding to the pressure in both chambers of the cylinder are required. This is achieved by pressure transducers on each inlet to the cylinder. Additionally a hall-effect sensor, or other type of discreet position sensor, is used at mid-stroke to re-calibrate the system occasionally, thus maintaining system accuracy.

For the initial concept, some variables are assumed to be known and constant. These include cylinder load, friction, and wear. In the present invention these could be determined and compensated for in real time using common measuring and control methods such as adaptive algorithms if desired.

For the purpose of this explanation, inefficiencies such as heat of compression, friction, and losses due to change of air direction are ignored. This description applies to a double-acting cylinder, where the end with the rod is called the "load" end and the opposing end is the "cap" end.

For a given fluid mass the equation that governs the relationship between pressure differential within two chambers is:

$$\frac{P_c * V_c}{T_c} = \frac{P_l * V_l}{T_l} \tag{2}$$

Where $P_c$, $V_c$, and $T_c$ are Pressure, Volume, and Temperature for chamber 1 (or cap end) and $P_l$, $V_l$, and $T_l$ are Pressure, Volume, and Temperature for chamber 2 (or load end).

If we assume that the temperatures are equal, the equation is simplified to:

$$P_c \cdot V_c = P_l \cdot V_l \tag{3}$$

As already described above:

$$F = P \cdot A \tag{4}$$

Where F, P, and A represent Force, Pressure, and Area, respectively.

This demonstrates that the force exerted within the cylinder is a function of the pressure on that end of the piston times the effective area. The effective area of the cap end of the piston is simply the internal area of the cylinder, and is represented by:

$$\frac{D_i^2 \cdot \pi}{4} = A_c \tag{5}$$

$D_i$ is the inner diameter of the cylinder and $A_c$ is the area of the cap-end of the cylinder.

The area for the load end of the piston is simply the equation above minus the area of the rod:

$$\frac{(D_i^2 - D_r^2) \cdot \pi}{4} = A_l \qquad (6)$$

Now that the area of the piston is known, it follows that the volume of the chambers can be described as:
For the cap end:

$$V_c = A_c \cdot L_c \qquad (7)$$

$L_c$ is the length from the inside end of the cap end to the surface of the piston.
For the load end:

$$V_l = A_l \cdot L_l \qquad (8)$$

$L_l$ is the length from the inside end of the cap end to the surface of the piston.
Therefore, the volume of air in the cap end of the cylinder is:

$$V_c = \frac{D_i^2 \cdot \pi}{4} \cdot L_c \qquad (9)$$

And the volume of air in the load end of the cylinder is:

$$V_l = \frac{(D_i^2 - D_r^2) \cdot \pi}{4} \cdot L_l \qquad (10)$$

Combining this with equation 2 yields:

$$P_c \cdot \frac{D_i^2 \cdot \pi}{4} \cdot L_c = P_1 \cdot \frac{(D_i^2 - D_r^2) \cdot \pi}{4} \cdot L_l \qquad (11)$$

Finally, the pressures required to move the cylinder a certain distance are:

$$P_c D_i^2 \cdot \frac{L_c}{L_l(D_i^2 - D_r^2)} = P_1 \qquad (12)$$

$$P_1 \cdot L_l \frac{(D_i^2 - D_r^2)}{D_i^2 \cdot L_c} = P_c \qquad (13)$$

Referring now to FIG. 1, implementation of the control method according to the present invention can be performed with a multi-valve configuration, such as a four-valve pack, coupled with two pressure transducers; i.e. one transducer for each port of the fluid operated cylinder. The transducers can be off-the-shelf parts, which are commercially available from vendors such as DigiKey. OpAmps can be used for signal conditioning in a standard circuit configuration, and feed into analog inputs of the valve pack. A position control system 10 according to the present invention is illustrated in FIG. 1 for controlling a fluid operated cylinder 12 having at least one fluid chamber 14, 16 defined by a piston 18 located within a housing 20 for movement between first and second end limits of travel 22, 24. The system 10 can include at least two electrically actuated proportional flow valves 26, 28, 30, 32 connected to each port 34, 36 of the fluid operated cylinder 12 to be controlled. The valves 26, 28, 30, 32 selectively and proportionally control fluid flow into and out of the at least one fluid chamber 14, 16 of the fluid operated cylinder 12 to be controlled. At least one pressure sensor 38, 40 is provided for measuring fluid pressure with respect to each chamber 14, 16 of the fluid operated cylinder 12 to be controlled. At least one discreet position sensor 42 is located adjacent a midpoint of the useable stroke of the fluid operated cylinder 12 to be controlled for sensing a discreet centered position of the piston 18 within the housing 20. A central processing unit 44 includes a control program and is operably connected to the at least two valves 26, 28, 30, 32, the at least one pressure sensor 38, 40, and the at least one position sensor 42 for controlling actuation of the at least two valves 26, 28, 30, 32 in response to pressure measured by the at least one pressure sensor, 38, 40 and location measured by the at least one position sensor 42.

The at least one discreet position sensor 42 can include a first position sensor 42 located adjacent a midpoint of the fluid operated cylinder, and a second position sensor 46 or 48 located adjacent one end of travel of the piston 18 in the housing 20 for providing soft stop deceleration of the piston 18 prior to contact with an end wall of the housing 20 defining the at least one chamber 14, 16. The at least one chamber 14, 16 can include a first expandable fluid chamber 14 adjacent one end of travel of the piston 18 in the housing 20 and a second expandable fluid chamber 16 adjacent another end of travel of the piston 18 in the housing 20. The at least two electrically actuated proportional flow valves 26, 28, 30, 32 can include a first valve 26 associated with the first expandable fluid chamber 14 for selectively and proportionally controlling fluid flow into the first expandable fluid chamber 14 and a second valve 28 associated with the first expandable fluid chamber 14 for selectively and proportionally controlling fluid flow out of the first expandable fluid chamber 14.

The at least one pressure sensor 38, 40 can include a first pressure sensor 38 associated with the first expandable fluid chamber 14 and a second pressure sensor 40 associated with the second expandable fluid chamber 16. A third pressure sensor 50 can be provided for monitoring the pressure of the pressurized fluid source. The at least one discreet position sensor 42 can include a first position sensor 42 located adjacent a midpoint of the fluid operated cylinder 12, a second position sensor 46 located adjacent one end of travel of the piston 18 in the housing 20 for providing soft stop deceleration of the piston 18 prior to contact with an end wall of the housing 20 defining the first chamber 14, and a third position sensor 48 located adjacent an opposite end of travel of the piston 18 in the housing 20 for providing soft stop deceleration of the piston prior to contact with an end wall of the housing 20 defining the second fluid chamber 16.

The control program according to the present invention can initialize a home position corresponding to the centered position of the piston 18 within the housing 20, when the piston 18 is sensed by the at least one discreet position sensor 42 located adjacent the midway position with respect to the housing 20. The control program according to the present invention can also calculate a value corresponding to an amount of pressure required in the at least one expandable fluid chamber 14, 16 for moving the piston 18 a desired distance within in the housing 20 from the discreet centered position located midway with respect to the housing 20. The control program can control the at least two electrically actuated proportional flow control valves 26, 28, and/or 30, 32 to obtain the calculated pressure within the at least one expandable fluid chamber 14, 16 corresponding to the desired distance of movement for the piston 18 within the housing 20. Various means can be provided for biasing the piston 18 toward the discreet centered position with respect to the housing 20. If only a single expandable fluid chamber is provided to be controlled by the present invention, the biasing means can include any suitable mechanical device, by way of example and not limitation, a return spring force. If two expandable fluid chambers 14, 16 are provided to be controlled by the system 10 according to the present invention, the biasing means corresponds to the second expandable fluid chamber. It should be recognized that the pressure calculations described in greater detail above can be modified to correspond to pressure acting against a mechanical spring force when determining the appropriate amount of pressure to provide in a single expandable fluid chamber, and that modifications to the pressure calculations could also be made to accommodate a dual piston rod configuration rather than the single rod piston configuration described in detail here.

The cylinder 12 preferably has two active expandable fluid chambers 14, 16 that effect a change in position and force of the piston 18 and connected rod. Two proportional control valves 26, 28 or 30, 32 are connected to each chamber 14, 16. One valve removes fluid, by way of example and not limitation, a fluid such as compressed air or hydraulic fluid, from the connected chamber, while the other valve supplies pressurized fluid to the connected chamber. The system includes control electronics 44, and preferably three pressure transducers, 38, 40. The control electronics 44, along with the onboard software, control the four proportional control valves 26, 28, 30, 32 in response to commands from an external source, by way of example and not limitation, such as commands from a network or computer workstation. The pressure transducers 38, 40, 50 monitor the pressure of the pressurized fluid supply, and both expandable fluid chambers 14, 16 in an effort to control the dispensing of pressurized fluid to and from the expandable chambers 14, 16 to provide accurate positioning control of the piston 18 and connected rod output force. In the preferred configuration, the proportional control valves 26, 28, 30, 32 can be piezo-electric actuated control valves of a type similar to those described in U.S. Pat. No. 6,548,938 issued on Apr. 15, 2003, or a piezo-electric actuator of the type similar to that disclosed in U.S. Design Pat. No. D483,335 issued on Dec. 9, 2003, or PCT Published Application No. WO 04/006,349 published on Jul. 3, 2003, or PCT Published Application No. WO 03/083,957 published on Mar. 25, 2003, or PCT Published Application No. WO 03/067,674 published on Jan. 22, 2003, or PCT Published Application No. WO 01/80,326 published on Mar. 29, 2001, or PCT Published Application No. WO 01/79,731 published on Mar. 29, 2001, all of which are incorporated by reference herein in their entireties. Preferably, by way of example and not limitation, the piezo-electric actuator is controlled for proportional valve operation by direct control of the voltage applied to the piezo, or by monitoring the amount of energy in the piezo-electric actuator and using a current charge control, which is different than pulse width modulation as used for proportional control of solenoid operated valves.

Figure 2:
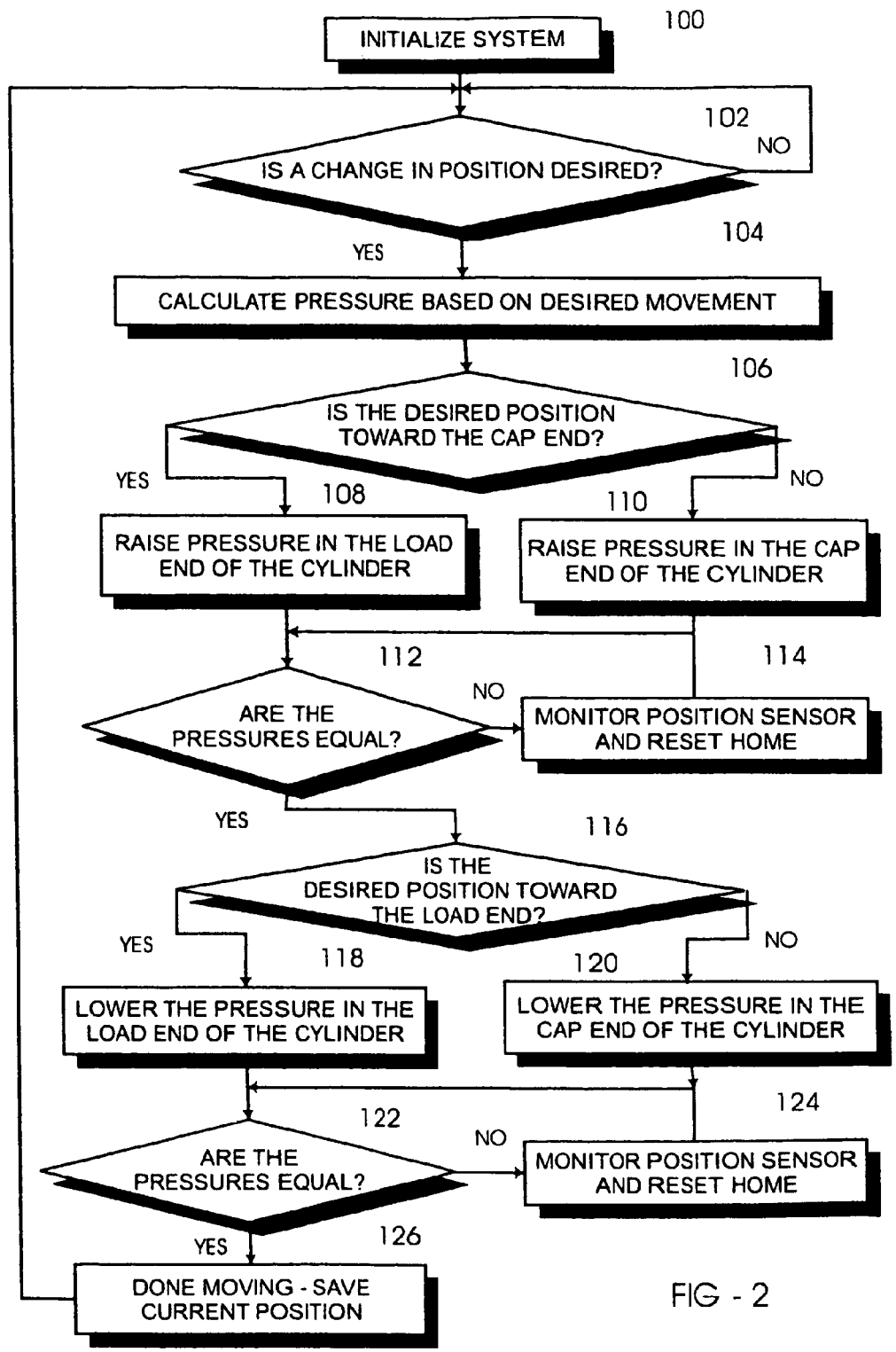
FIG. 2 is a simplified schematic view of a flow diagram for the control program according to the present invention.

Referring now to FIG. 2, the software code controls both pairs of valves on each side of the cylinder simultaneously as described in the control flow chart. The control program according to the present invention can best be understood by reference to FIG. 2. The control program can begin by initializing the system in step 100. During the initialization step 100, the control program locates a home or piston-centered position as indicated by a hall-effect sensor, and brings pressure on both sides of the piston 18 to be equal to one another so that there is no movement of the piston 18 within the housing. By way of example and not limitation, for a system with relatively constant operating conditions, the control system can bring the pressure on both sides of the cylinder to 50 psi while at the centered position which can be verified by the signals received from the at least one position sensor 42 and the at least one pressure sensor 38, 40. Once the system is initialized in step 100, the control program continues to query 102 to determine if a change in position is desired. If a change in position is not desired, the control program returns to the beginning of query 102. If a change in position is desired, the control program continues to step 104 where the necessary pressure is calculated based on the desired movement. The control program then continues to query 106 where it is determined if the desired position is toward the cap end of the cylinder 12. If the desired position is toward the cap end, the program branches to step 108 where pressure is raised in the load end expandable fluid chamber of the cylinder 20. If the desired position is not toward the cap end in response to query 106, the control program branches to step 110 where pressure is raised in the cap end expandable fluid chamber of the cylinder 20.

After performing either step 108 or step 110, the program continues to query 112 where it is determined if the pressures on either side of the piston 18 are equal. If the pressures are not equal, the program branches to step 114 to monitor the at least one position sensor 42 and to reset the home centered position of the piston 18. After performing step 114, the control program returns to the beginning of query 112. If the pressures are equal in query 112, the control program continues to query 116 where it is determined if the desired position is toward the load end of the cylinder 20. If the desired position is toward the load end in response to query 116, the control program continues to step 118 where pressure is lowered in the load end expandable fluid chamber of the cylinder 20. If the desired position is not toward the load end in response to query 116, the control program continues to step 120 where the pressure is lowered in the cap end expandable fluid chamber of the cylinder 20.

After performing either step 118 or step 120, the program continues to query 122, where it is determined if the pressures on both sides of the piston 18 are equal. If the pressures on both sides of the piston 20 are not equal in response to query 122, the control program branches to step 124 to monitor the at least one position sensor 42 and to reset the home centered position of the piston 18 in the housing 20. After performing step 124, the control program returns to the beginning of query 122 to determine if the pressures on both sides of the piston 18 are equal. If the pressures on both sides of the piston 18 are equal in response to query 122, the control program continues to step 126 indicating that the piston 18 is done moving, since the piston has reached the desired position, and the current position is saved by the control program. After performing step 126, the control program returns to the beginning of query 102.

It should be recognized that the control program described in FIG. 2 corresponds to a cylinder 12 having first and second expandable fluid chambers 14, 16 defined by a piston 18 located within a housing 20 for movement between first and second end limits of travel. If only a single expandable fluid chamber is provided, the control program illustrated in FIG. 2 can be modified by eliminating query 116, steps 118, 120, query 122 and step 124. In this configuration, if the answer to query 112 is yes, the control program can continue directly to step 126 and continue as previously described. As previously described in greater detail above, this configuration can include mechanical means for biasing the piston 18 toward the home centered position with respect to the housing 20, by way of example and not limitation, such as a mechanical spring force.

Figure 3:
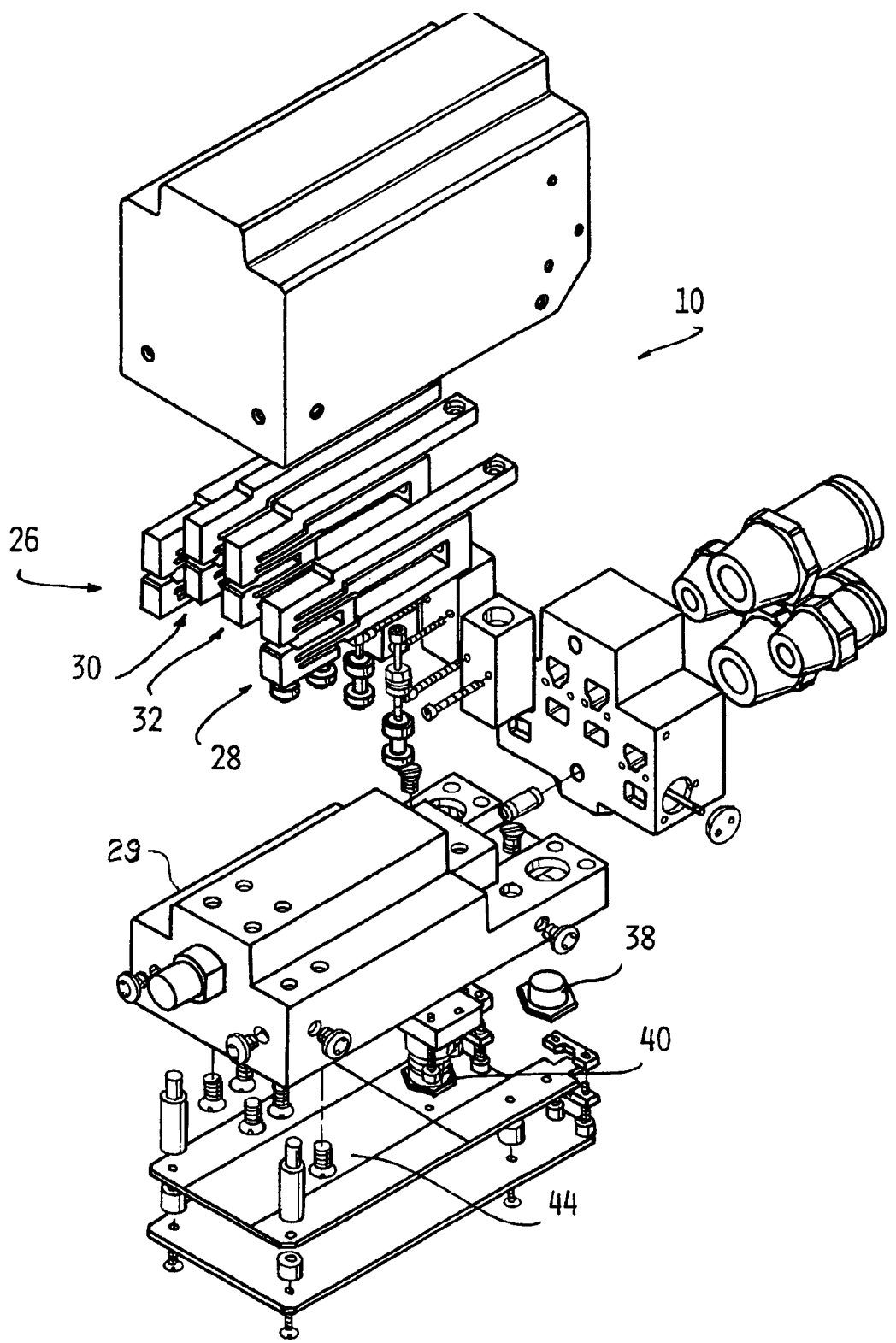
FIG. 3 is an exploded perspective view of a multi-valve manifold for controlling fluid flow with respect to a fluid operated cylinder according to the present invention.

Referring now to FIG. 3, the present invention includes a combination of four independently controllable piezo powered actuators 26, 28, 30, 32, Each actuator is combined with a "two-way" valve. The valves are operable proportionally according to the present invention. The valves are preferably pressure balanced to enhance flow capabilities. The valves are connected in fluid communication with one another through a manifold 29 so that the four valves define two "pairs" of valves. The multi-valve manifold according to the present invention allows proportional control of both, the inlet and outlet of each side of the actuator, by way of example and not limitation, such as a fluid operated cylinder. The manifold is arranged so there are four ports, by way of example and not limitation, such as pneumatic ports. These ports include one inlet, two outlets (one to each side of the cylinder) and one exhaust. The ports are sized to provide the maximum flow capability of the valves. Pressure sensors are located in the manifold in communication with the inlet port and each of the outlet ports. Control electronics can be mounted within the "base" of the housing that contains the actuators, valves and manifold. The control electronics can include a micro-controller to determine the exact operation of the valves. The control electronics can also include a custom power system to provide the appropriate power to the piezo actuators. The micro-controller can receive one or more input signals from the pressure sensors and one or more position sensors located on the pneumatic actuator. An electrical connection can be provided for communication to a control network and to provide operating power. A second connection can communicate with the position sensors. The pressure sensors can be connected directly to the electronics. The complete assembly can be enclosed in a single, compact unit. The single, compact unit can be designed to facilitate mounting on the side of a pneumatic actuator. However, it should be recognized that the single, compact unit can easily be mounted in any desired location.

Use of the piezo actuators enables much higher speed response when compared to solenoid actuators. Actuation speed response times on the order of 1 ms can be possible with piezo actuators, compared to between 5 ms and 50 ms or more actuation speed response times of typical solenoid actuators. The speed improvement according to the present invention increases the potential operating rate of a fluid operated cylinder actuator and the process or mechanism it is controlling. More important, the speed improvement of the present invention facilitates accurate control of the fluid operated cylinder actuator by providing rapid reaction to changes in operating conditions. Use of the piezo actuators enables use of relatively simple electronics for proportional operation. This, in turn, enables precise control of the valves and, therefore, the pneumatic actuator. The piezo actuator provides a compact and relatively light weight package compared to solenoid based valves. This enables a variety of mounting techniques and positions including mounting directly on the pneumatic actuator. Mounting the present invention directly on the actuator can be important for several reasons. First, by minimizing the distance from the valves to the actuator, the amount of fluid, such as compressed air, that is used per cycle can be reduced. This can be quite significant in a high production facility or when used with "large" actuators. Second, reducing the distance increases the responsiveness of the pneumatic actuator. Less air and time is required for pressurizing the air delivery lines. Third, reducing the distance can improve the performance by increasing "stiffness" of the pneumatic system that, in turn, aids in minimizing system non-linearities. For example, it can be typical in many applications using solenoid based valves for the valves to be connected to the pneumatic actuator by tens of feet of plastic tubing. The length of tubing can "balloon" slightly during pressurization, but sufficiently to affect accurate control in an application requiring high performance. The piezo actuators can consume substantially less power compared to solenoids. Consuming less power allows operation methods presently impossible with solenoid based systems. Typically, once actuated, a solenoid draws from between 0.5 watts (W) to 20 watts (W). Proportional solenoid operated valves with flow rates comparable to the multi-valve manifold pack according to the present invention can easily draw 10 watts (W) each. The associated electronics for four proportional solenoid valves can draw an additional 10 watts (W) to 50 watts (W). Total power consumption of 50 watts (W) to 100 watts (W) can be highly probable. By comparison, each piezo actuator can use as little as 0.010 watts (W) and the electronics will generally use less than 1 watt (W) for a total of approximately 1 watt (W) or less. Such low power consumption provides extensive options for networking and methods of providing power that, in turn, can reduce installation complexity and cost compared to solenoid based systems. Further, the power consumption of the present invention results in negligible heat generation when compared to solenoids. The preferred design for the fluid portion of the valve can be pressure balanced. The pressure balanced fluid valve provides the potential for substantially greater flow for a given piezo actuator size. The greater flow benefit can be as much as approximately 5 fold compared with a non-pressure balanced valve. When compared to competitive systems based on electronic servo motors, the present invention does not provide the same level of accuracy. However, acquisition and setup cost of the present invention can be much lower. For high performance, closed loop feedback of the position of the pneumatic actuator can be added, at a much lower cost for the present invention than for comparable electronic servos. When compared to competitive systems using solenoid based pneumatics, the present invention provides a high level of performance without the position feedback required with the solenoid based system. Adding feedback to the present invention could result in a system with performance that exceeds a solenoid based system. Standard open loop control, without position feedback, has been demonstrated with the present invention to provide accuracy and repeatability that can be better than approximately 1% of full stroke for a system with relatively constant operating conditions. With position feedback, it is believed that the performance can be on the order of better than 0.5 mm. Competitive systems based on standard on/off spool valves have the benefit of valve simplicity at a severe cost of control flexibility and performance. Competitive systems based on standard proportional spool valves have the benefit of improved performance compared to a basic on/off operation, but at a much higher cost. Additionally, since the valve operation is determined by the movement of a single spool relative to orifices with fixed spacing, performance is still substantially limited compared to individually controlled proportional valves with high responsiveness such as disclosed in the present invention. Competitive systems based on individual solenoid valves are frequently custom assemblies. As such, the competitive systems tend to be large and heavy, preventing the competitive systems from being mountable on the pneumatic actuator when weight or size is a consideration such as when mounted on robotic arms.

While the valves in the current embodiment have a flow coefficient of ($C_v$) approximately 1.0, other sizes, smaller and larger, are possible. The current embodiment uses quick connect tubing for the pneumatic connections. Various alternative connection options exist as is well known to those skilled in the art. By way of example and not limitation, connections can include: pipe fittings; pneumatic passages integral to the valve pack and the pneumatic actuator; etc. The multi-valve manifold pack according to the present invention can be described for purposes of illustration as based on a four valve configuration. The four valve configuration described in the present invention can be appropriate for pneumatic actuators that require active control in both directions. Certain actuators do not need this level of control and have a spring integral to the pneumatic actuator to provide "return" force. In this case, a multi-valve manifold pack according to the present invention can be provided with only two valves, rather than the four valve configuration previously described. As should be apparent to those skilled in the art, the two valve manifold pack can control operation of the fluid operated cylinder in one direction, while the return force, such as an integral spring controls force in the opposite direction. In addition to the control of a pneumatic cylinder, the present invention can be used to control other types of pneumatic actuators, for example large process valves or pneumatic motors. The exemplary embodiment described above is based on use of a personal computer (PC) universal serial bus (USB) for: control signals, programming of the micro-controller and for all operating power. With relatively straightforward modification, it is believed that any commercially available industrial control system can be adapted to operate according to the present invention. Due to the low power consumption of the valve pack, the present invention can be uniquely suited to support radio frequency (RF) based valve operation, or operation where the electrical source is relatively low power, such as batteries, intrinsically safe systems, datacom networks, photo-voltaics or other micro scale local power generation. The system according to the present invention can be supportive of two way communication to provide operating and diagnostic information. The micro-controller can be supportive of expanded sensor input for enhanced operation including: absolute position sensing of the pneumatic actuator which can, in turn, support closed loop control of the pneumatic actuator position; fluid flow; and various temperatures. The present invention can be physically reoriented or even split, so that two valves are at or nearest each end of a pneumatic cylinder to further maximize performance. Although packaging of the electronics with the valves provides benefits and is preferred in the present invention, it should be recognized by those skilled in the art that alternatively the electronics can be located at a distance from the valves. A key to the operation and performance of the present invention can be the use of a pair of independently controllable, proportional, high speed, piezo actuated valves. It should be noted that the valves in each pair do not need to be the same performance with respect to flow rates. It can be desirable, for example, to have one valve designed for a higher flow rate than the other.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for controlling a position of a fluid operated cylinder having at least one fluid chamber defined by a piston located within a housing for movement between first and second end limits of travel, the apparatus comprising:
    at least one electrically actuated proportional flow control valve connected in fluid communication with each inlet port and each outlet port of the fluid operated cylinder to be controlled for selectively and proportionally controlling fluid flow into and out of the at least one fluid chamber of the fluid operated cylinder to be controlled;
    at least one pressure sensor for measuring fluid pressure with respect to each chamber of the fluid operated cylinder to be controlled;
    at least one discrete position sensor associated with the fluid operated cylinder to be controlled for sensing a discrete predetermined position of the piston within the cylinder to be controlled; and
    a control program executable by a control device operably connectible to the at least one valve, the at least one pressure sensor, and the at least one position sensor for controlling actuation of the at least one valve, the control program configured to calculate a pressure in the at least one fluid chamber required to move the piston a selected distance from a predetermined position within the housing, and for controlling the at least one electrically actuated proportional flow valve to obtain the calculated pressure within the at least one fluid chamber corresponding to the selected distance of movement for the piston within the cylinder to be controlled.

2. The apparatus of claim 1, wherein the at least one discrete position sensor further comprises:
    a first position sensor located adjacent a midpoint of the operating stroke of the fluid operated cylinder; and
    a second position sensor located adjacent one end of travel of the piston in the cylinder to be controlled for providing soft stop deceleration of the piston prior to contact with an end wall of the cylinder to be controlled defining the at least one chamber.

3. The apparatus of claim 1 further comprising:
    the at least one fluid chamber including a first expandable fluid chamber adjacent one end of travel of the piston in the cylinder to be controlled and a second expandable fluid chamber adjacent another end of travel of the piston in the cylinder to be controlled.

4. The apparatus of claim 3 further comprising:
    the at least one electrically actuated proportional flow valve including a first valve associated with the first expandable fluid chamber for selectively and proportionally controlling fluid flow into the first expandable fluid chamber and a second valve associated with the first expandable fluid chamber for selectively and proportionally controlling fluid flow out of the first expandable fluid chamber.

5. The apparatus of claim 3 further comprising:
    the at least one pressure sensor includes a first pressure sensor associated with the first expandable fluid chamber and a second pressure sensor associated with the second expandable fluid chamber.

6. The apparatus of claim 3 further comprising:
    the at least one discrete position sensor including a first position sensor located adjacent a midpoint of the fluid operated cylinder operating stroke to be controlled, a second position sensor located adjacent one end of travel of the piston in the cylinder to be controlled for providing soft stop deceleration of the piston prior to contact with an end wall of the cylinder to be controlled defining one chamber, and a third position sensor located adjacent an opposite end of travel of the piston in the cylinder to be controlled for providing soft stop deceleration of the piston prior to contact with an end wall of the cylinder to be controlled defining another chamber.

7. The apparatus of claim 1 further comprising:
the control program configured for initializing a home position when the piston is sensed by the at least one discrete position sensor located adjacent a midway position with respect to the cylinder to be controlled.

8. The apparatus of claim 1 further comprising:
means for biasing the piston toward a discrete centered position with respect to the cylinder to be controlled.

9. The apparatus of claim 1, wherein the electrically actuated proportional control valve includes a piezo adapted for operating with a variable voltage for enabling selective adjustment of the fluid flow into and out of the at least one fluid chamber of the fluid operated cylinder based on the voltage applied to the piezo.

10. The apparatus of claim 1, wherein the electrically actuated proportional control valve includes a piezo adapted for operating with a variable electric current for enabling selective adjustment of the fluid flow into and out of the at least one fluid chamber of the fluid operated cylinder.

11. The apparatus of claim 1, the control device further comprising a controller for executing the control program, the controller operably connected to the at least one valve, the at least one pressure sensor, and the at least one position sensor, and operable for receiving an input corresponding to the distance the piston is to be moved from the predetermined position within the housing.

12. The apparatus of claim 1, further comprising manifold having at least one fluid inlet port, at least one fluid outlet port, and at least one fluid exhaust port, the manifold fluidly connected to the at least one electrically actuated proportional control valve.

13. A method for controlling a fluid operated cylinder having at least one fluid chamber defined by a piston located within a housing for movement between first and second end limits of travel, the method comprising the steps of:
employing at least one electrically actuated proportional flow valve fluidly connected to at least one fluid chamber of the fluid operated cylinder;
measuring a fluid pressure with respect to each chamber of the fluid operated cylinder to be controlled with at least one pressure sensor;
sensing a discrete position of the piston within the cylinder with at least one discrete position sensor;
selecting a distance to move the piston from a predetermined position within the housing;
calculating a pressure to be applied to the at least one fluid chamber required to move the piston the selected distance from the predetermined position within the housing based on the position measured by the at least one position sensor; and
adjusting the pressure within the at least one fluid chamber to correspond to the calculated pressure by selectively and proportionally controlling fluid flow into and out of the at least one fluid chamber of the fluid operated cylinder to be controlled with the at least one electrically actuated proportional flow valve.

14. The method of claim 13, wherein the position sensing step with the at least one discrete position sensor fUrther comprises the steps of:
locating a first position sensor adjacent a midpoint of an operating stroke of the fluid operated cylinder;
locating a second position sensor adjacent one end of travel of the piston in the housing;
sensing a discrete position adjacent one end of travel of the piston with respect to the housing with the second position sensor; and
decelerating the piston to a soft stop prior to contact with an end wall of the housing defining the at least one chamber in response to the second position sensor.

15. The method of claim 13, wherein the at least one fluid chamber further comprises the steps of:
employing a first expandable fluid chamber adjacent one end of travel of the piston in the housing; and
employing a second expandable fluid chamber adjacent another end of travel of the piston in the housing.

16. The method of claim 15, wherein the controlling fluid flow step with at least two electrically actuated proportional flow valves further comprises the steps of:
employing a first valve associated with the first expandable fluid chamber for selectively and proportionally controlling fluid flow into the first expandable fluid chamber; and
employing a second valve associated with the first expandable fluid chamber for selectively and proportionally controlling fluid flow out of the first expandable fluid chamber.

17. The method of claim 15, wherein the pressure sensing step with at least one pressure sensor further comprises the steps of:
employing a first pressure sensor associated with the first expandable fluid chamber; and
employing a second pressure sensor associated with the second expandable fluid chamber.

18. The method of claim 15, wherein the position sensing step with at least one discrete position sensor further comprises the steps of:
employing a first position sensor located adjacent a midpoint of an operating stroke of the fluid operated cylinder;
employing a second position sensor located adjacent one end of travel of the piston in the housing for providing soft stop deceleration of the piston prior to contact with an end wall of the housing defining one chamber; and
employing a third position sensor located adjacent an opposite end of travel of the piston in the housing for providing soft stop deceleration of the piston prior to contact with an end wall of the housing defining another chamber.

19. The method of claim 13 further comprising the steps of:
positioning at least one discrete position sensor substantially adjacent a midpoint of an operating stroke of the fluid operated cylinder to be controlled; and
initializing a home position when the piston is sensed by the at least one discrete position sensor to be located adjacent the midpoint of the operating stroke.

20. The method of claim 13, wherein the step of calculating a pressure further comprises the steps of:
calculating a required pressure in the at least one fluid chamber for moving the piston a desired distance within the housing from a discrete centered position located midway with respect to the housing; and controlling the at least two electrically actuated proportional flow valves to obtain the calculated pressure within the at least one expandable fluid chamber corresponding to the desired distance of movement for the piston within the housing.

21. The method of claim 13 further comprising the step of:
biasing the piston toward a discrete centered position with respect to the housing.

22. An apparatus for controlling a fluid operated cylinder having two fluid chambers defined by a piston located within a housing for movement between first and second end limits of travel, the apparatus comprising:
a manifold having at least one fluid inlet port, at least one fluid outlet port and at least one fluid exhaust port;
four electrically actuated proportional flow valves, two valves connected to each port of the fluid operated cylinder to be controlled for selectively and proportionally controlling fluid flow into and out of the two fluid chambers of the fluid operated cylinder to be controlled;
two pressure sensors, one pressure sensor for measuring fluid pressure with respect to each chamber of the fluid operated cylinder to be controlled;
at least one discrete position sensor located adjacent a midpoint of the operating stroke of the fluid operated cylinder to be controlled for sensing a discrete centered position of the piston within the cylinder to be controlled; and
a controller operably connected to the four valves, the two pressure sensors, and the at least one position sensor for controlling actuation of the four valves, the controller operable for calculating a pressure within each of the two fluid chambers required for moving the piston a selected distance from the discrete centered position, and for controlling the four electrically actuated proportional flow valves to obtain the calculated pressure within each of the two fluid chambers corresponding to the desired distance of movement for the piston within the housing.

23. The apparatus of claim 22 further comprising:
the at least one discrete position sensor including a first position sensor located adjacent a midpoint of the operating stroke of the fluid operated cylinder to be controlled, a second position sensor located adjacent one end of travel of the piston in the housing for providing soft stop deceleration of the piston prior to contact with an end wall of the housing defining the first chamber, and a third position sensor located adjacent an opposite end of travel of the piston in the housing for providing soft stop deceleration of the piston prior to contact with an end wall of the housing defining the second chamber.

24. The apparatus of claim 22 further comprising:
a control program executable by the controller for initiaLizing a home position when the piston is sensed by the at least one discrete position sensor located adjacent the midway position with respect to the housing.

25. The apparatus of claim 22, wherein each of the four electrically actuated proportional control valve includes a piezo adapted for operating with a variable voltage for enabling selective adjustment of The fluid flow into and out of the two fluid chambers of the fluid operated cylinder based on the voltage applied to the piezo.

26. The apparatus of claim 22, wherein each of the four electrically actuated proportional control valves includes a piezo adapted for operating with a variable electric current for enabling selective adjustment of The fluid flow into and out of the two fluid chambers of the fluid operated cylinder.

* * * * *